March 21, 1967 J. S. BOZEK 3,309,980
DISPOSABLE COFFEE CONTAINER
Filed March 3, 1964 2 Sheets-Sheet 1
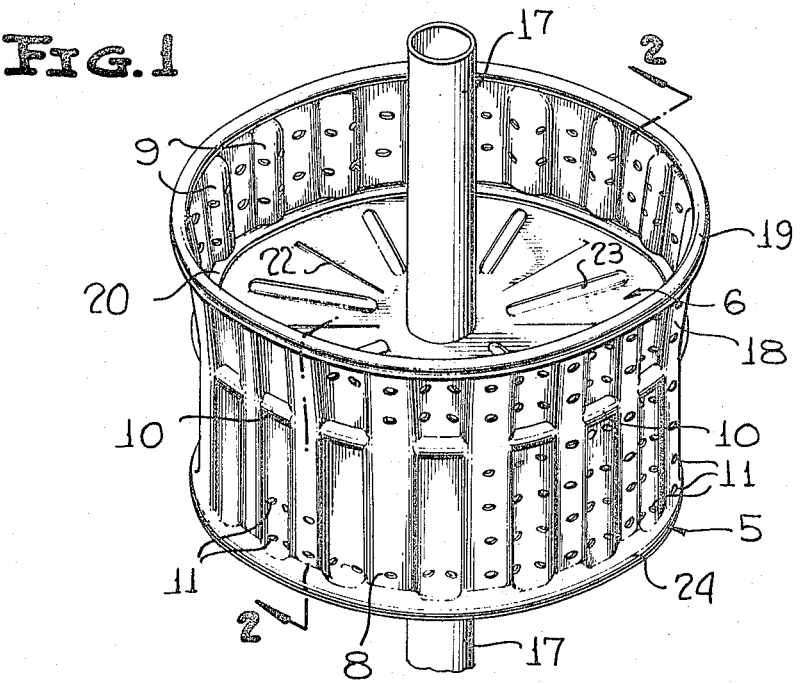
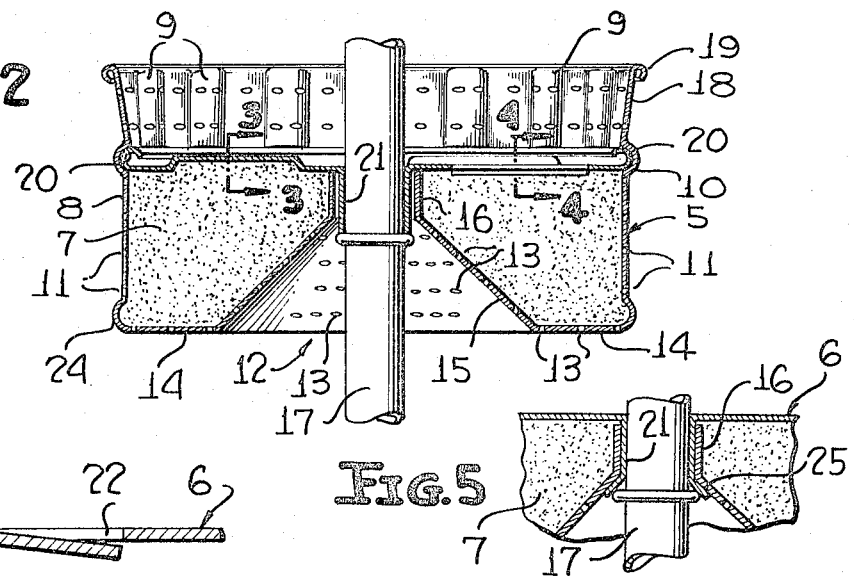
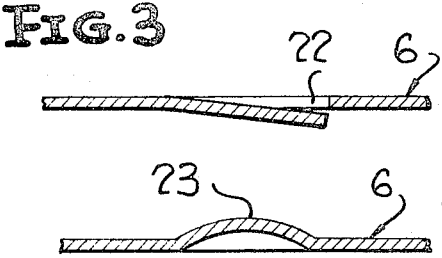
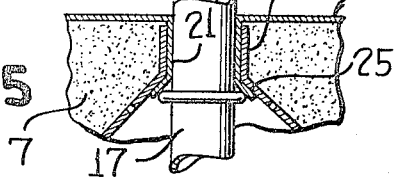
INVENTOR
JOHN S. BOZEK
BY Mason, Porter, Diller & Stewart
ATTORNEYS March 21, 1967     J. S. BOZEK     3,309,980
DISPOSABLE COFFEE CONTAINER
Filed March 3, 1964     2 Sheets-Sheet 2
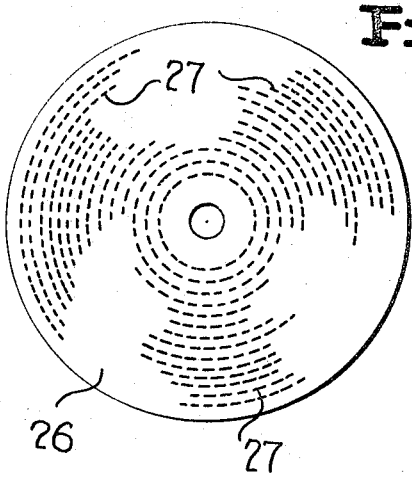
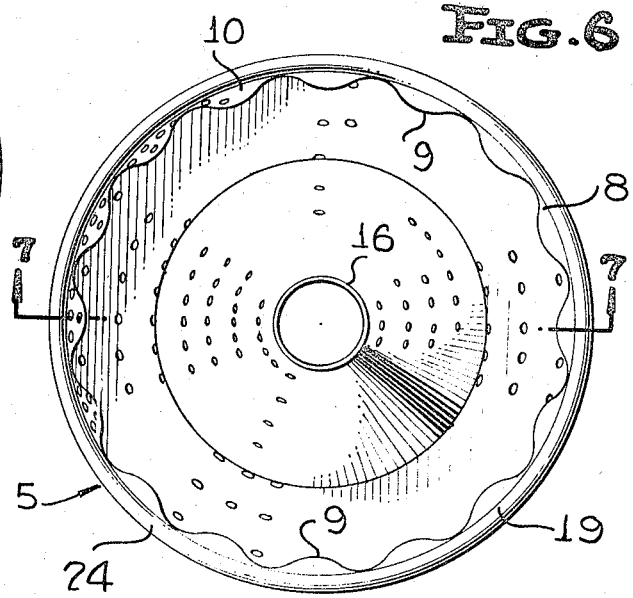
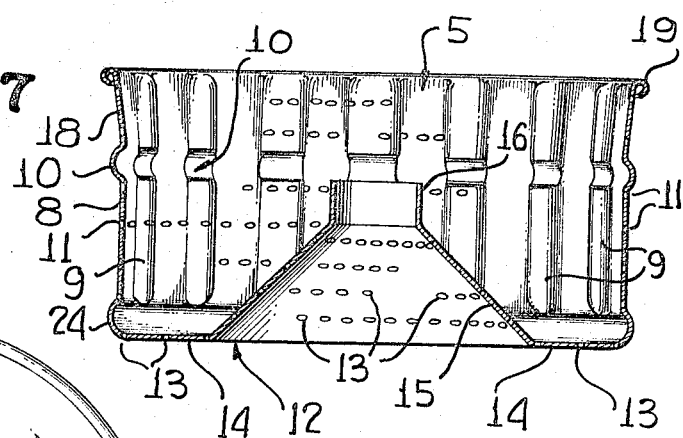
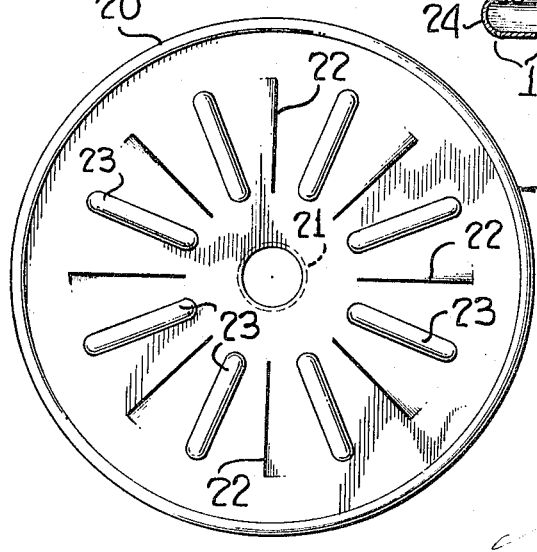
INVENTOR
JOHN S. BOZEK
ATTORNEYS

United States Patent Office 3,309,980
Patented Mar. 21, 1967

---

3,309,980
DISPOSABLE COFFEE CONTAINER
John S. Bozek, Chicago, Ill., assignor to Continental Can Company, Inc., New York, N.Y., a corporation of New York
Filed Mar. 3, 1964, Ser. No. 349,117
15 Claims. (Cl. 99—295)

The invention relates generally to special packages or fill containers and primarily seeks to provide a novel form of package made up inexpensively of foil or other acceptable material to contain a predetermined quantity of coffee and which may be readily placed in a coffee maker wherein the usual boiling water will be directed to filter through the coffee fill to form the desired potable beverage, after which the container with its used or spent fill of coffee grounds may be removed from the coffee maker and thrown away.

Disposable coffee packages are known, but use thereof has been somewhat restricted because of objections to the nature and form of known packages. Some have been complicated in structure so as to make manufacture economically impractical, and some have presented impractical structural features. For example, one known container of the character mentioned employs a body having a complicated fold structure which, while said to have merit in permitting expansion of the body structure when the previously dry coffee fill expands as it becomes water soaked, presents the objectionable feature of having the folds hold considerable quantities of the brew by capillary action instead of permitting it to pass down into the coffee maker in the desired manner.

A purpose of the invention is to provide a special coffee package of the character stated which can be made up inexpensively, and used in a wholly practical manner, while avoiding objections and problems attending manufacture and use of prior known structures.

In its more detailed nature the invention resides in providing a package of the character stated wherein the fill of ground coffee is provided in a container comprising a generally cup-shaped body having a bottom centrally apertured for mounting over a percolator tube, and a side wall having therein circumferentially spaced upright stiffener beads, the side wall including shouldering placed a predetermined distance above the bottom wall to provide cover disc seating means, a cover disc centrally apertured for mounting over a percolator tube and having a peripheral edge portion seated on the seating means, the bottom being perforated, and the disc having radially disposed spaced stiffener beads and radially disposed slits to pass therethrough water which may be delivered into the body from a percolator tube over which the body may be mounted.

An object of the invention is to provide a disposable coffee container of the character stated wherein the portion of the body rising above the fill covering disc seating means is upwardly flared.

Another object of the invention is to provide a disposable coffee container of the character stated wherein the cover disc has a peripheral stiffener curl disposed to engage the seating means and wherein the body portion below the seating means is provided with perforations.

A further object of the invention is to provide a disposable coffee container of the character stated wherein the perforated bottom of the generally cup-shaped body includes an outer flat and generally horizontal annulus and an inner upwardly extending frusto-cone portion carrying at its upper extremity a cylindrical portion defining the percolator tube receiving mounting aperture, the cover disc also having a depending cylindrical portion defining its percolator tube receiving mounting aperture and disposed to telescope with the beforementioned cylindrical portion, and optionally to interlock therewith.

A still further object of the invention is to provide a container structure of the character stated wherein the cup-like body is made up from a circular disc blank.

With the above and other objects in view that will hereinafter appear, the nature of the invention will be more clearly understood by reference to the following detailed description, the appended claims and the several views illustrated in the accompanying drawings.

In the drawings:

FIGURE 1 is a perspective view illustrating the improved disposable coffee package mounted on a conventional percolator tube.

FIGURE 2 is a vertical cross section taken on the line 2—2 on FIGURE 1.

FIGURE 3 is an enlarged fragmentary sectional view taken through one of the cover disc slits on the line 3—3 on FIGURE 2.

FIGURE 4 is an enlarged fragmentary sectional view illustrating one of the cover disc stiffener beads, the section being taken on the line 4—4 on FIGURE 2.

FIGURE 5 is a fragmentary sectional view illustrating the telescoped assembly of the cylindrical portions of the container body and the cover disc, the depending cylindrical portion of the cover disc being shown as flared into interlocking engagement with the central portion of the body.

FIGURE 6 is a plan view of the cup-like container body.

FIGURE 7 is a vertical cross section taken on the line 7—7 on FIGURE 6.

FIGURE 8 is a plan view of the cover disc.

FIGURE 9 is a small scale plan view illustrating a blank from which the container body may be formed.

In the practical development of the invention, the improved disposable coffee container is formed to include a cup-like body generally designated 5, a cover disc generally designated 6, and the fill 7 of ground coffee. It is to be understood that the body and disc cover of the improved container are preferably formed of foil, although other acceptable disposable materials may be used.

The body includes a generally cylindrical side wall 8 which is stiffened by the provision of upright, circumferentially spaced ribs or beads 9. The stiffener elements 9 are interrupted intermediately of the height of the side wall of the cup-like container to provide shouldering 10 forming seating means for receiving the cover disc in the manner clearly illustrated in FIGURES 1 and 2. It will be observed that the side wall of the container body is orificed or apertured, as at 11. The body includes a bottom 12 which is perforated or orificed at 13 and includes an annular flat and generally horizontal annulus 14 and an inner upwardly extending frusto-cone portion 15, the latter carrying at its upper extremity a cylindrical portion 16 defining a receiving aperture through which the conventional percolator tube 17 of a conventional form of coffee maker (not shown) may be projected.

It will be observed by reference to FIGURES 1, 2 and 7 of the drawings that the portion of the container side wall 8 rising above the seating means or shoulder 10 is upwardly and outwardly flared at 18, and the upper or terminal edge of this flared portion is formed into a stiffener curl or bead 19.

The cover disc, best illustrated in FIGURES 1 to 4 and 8 of the drawings and generally designated 6 is provided with a peripheral stiffener curl or bead 20 to be received on the previously mentioned seating means, as illustrated in FIGURES 1 and 2. The disc 6 has a central depending cylindrical portion 21 defining an aperture disposed to receive the percolator tube 17 in the manner illustrated in FIGURES 2 and 5. The disc also is provided with radially projected, spaced slits 22 which are effective to pass therethrough water delivered into the upper portion of the container body from the percolator tube 17 in the usual manner, this water being directed into the coffee fill 7 to filter through the coffee fill and out through the body orificing 11, 13 into the interior of the coffee maker. Intermediate, radially disposed and spaced stiffener ribs or beads 23 also are provided on the cover disc 6. It will be apparent by reference to FIGURES 1, 2, 6 and 7 of the drawings that the cup-like body may also be provided with a stiffener rib or bead 24 at the juncture of the side wall and the bottom of said body. The particular arrangement of stiffening devices 9, 10, 19, 20, 23 and 24 serves to provide in the disposable foil assembly sufficient rigidity to assure convenient and practical use of the package, and yet provide a structure which is disposable after having served its intended purpose in the making of the coffee beverage.

While the cover disc and container body cylindrical portions or necks 21, 16 may be telescoped and mounted as illustrated in FIGURE 2, if desired, it may be preferred that the neck portion 21 of the cover be flared downwardly and outwardly at 25 to interlock beneath the bottom neck or cylindrical portion 16 as illustrated in FIGURE 5.

In FIGURE 9 of the drawings there is illustrated a blank disc 26 of foil or other acceptable formable and disposable material which can be shaped up to provide a cup-like container body such as is illustrated in FIGURES 2, 6 and 7 of the drawings. The blank may be provided with slits 27 which will be forced to open into generally elliptical or aperture orifice shape incidental to the shaping up of the cup-like body. This manner of forming the orificing may be resorted to, or the disc blank may be perforated in the pattern indicated in FIGURE 9 or in any other acceptable pattern. While orificing is illustrated in FIGURES 2 and 7 of the drawings in the portion of the cup-like body extending above the cover disc 6, it is to be understood that such orificing may be dispensed with, if desired.

While a preferred construction and arrangement of parts is shown and described herein in the disclosure of the improved disposable coffee package, it is to be understood that variations in structure and part arrangements may be made without departing from the spirit and scope of the invention as defined in the appended claims.

I claim:

1. A disposable coffee container formed of thin sheet material and comprising a generally cup-shaped body having a bottom centrally apertured for mounting over a percolator tube, and a side wall having therein circumferentially spaced upright stiffener beads, said side wall including shouldering placed intermediately of the height of said side wall and at a predetermined distance above the bottom wall to provide cover disc seating means, a generally planar cover disc centrally apertured for mounting over a percolator tube and having a peripheral edge portion seated on said seating means to adapt the side wall for peripherally defining a coffee grounds confining chamber beneath said cover disc and a percolating water receiving chamber above said disc, the bottom being perforated, and the disc having radially disposed spaced stiffener beads and radially disposed slits disposed intermediately of said radially disposed stiffener beads to pass therethrough water which may be delivered into the body from a percolator tube over which the body may be mounted.

2. A disposable coffee container as defined in claim 1 wherein the portion of the side wall rising above the cover disc seating means is upwardly flared.

3. A disposable coffee container as defined in claim 1 wherein the side wall portion extending below the cover disc seating means also is provided with perforations and the portion of said side wall rising above said seating means is upwardly flared and has its terminal edge formed into a strengthening curl.

4. A disposable coffee container as defined in claim 1 wherein the cover disc seating means is in the form of shouldering provided on the side wall stiffener beads.

5. A disposable coffee container as defined in claim 1 wherein the side wall portion extending below the cover disc seating means also is provided with perforations and the portion of said side wall rising above said seating means is upwardly flared and has its terminal edge formed into a strengthening curl, and wherein the cover disc has a peripheral stiffener curl disposed to engage on the cover disc seating means.

6. A disposable coffee container as defined in claim 1 wherein the cover disc seating means is in the form of shouldering provided on the side wall stiffener beads, and the cover disc has a peripheral stiffener curl disposed to engage on the stiffener bead shouldering.

7. A disposable coffee container as defined in claim 1 wherein the side wall portion extending below the cover disc seating means also is provided with perforations and the portion of said side wall rising above said seating means is upwardly flared and has its terminal edge formed into a strengthening curl, and wherein the cover disc seating means is in the form of shouldering provided on the side wall stiffener beads, and the cover disc has a peripheral stiffener curl disposed to engage on the stiffener bead shouldering.

8. A disposable coffee container as defined in claim 7 wherein the perforated bottom of the generally cup-shaped body includes an outer flat and generally horizontal annulus and an inner upwardly extending frusto-cone portion carrying at its upper extremity an upwardly extending cylindrical portion defining an inner wall of the coffee grounds confining chamber and the percolator tube receiving mounting aperture.

9. A disposable coffee container as defined in claim 7 wherein the perforated bottom of the generally cup-shaped body includes an outer flat and generally horizontal annulus and an inner upwardly extending frusto-cone portion carrying at its upper extremity a cylindrical portion defining the percolator tube receiving mounting aperture, the cover disk also having a depending cylindrical portion defining its percolator tube receiving mounting aperture and disposed to telescope the beforementioned cylindrical portion and being flared downwardly and outwardly at its lower end extremity to interlock with and beneath the body bottom cylindrical portion.

10. A disposable coffee container as defined in claim 1 wherein the perforated bottom of the generally cup-shaped body includes an outer flat and generally horizontal annulus and an inner upwardly extending frusto-cone portion carrying at its upper extremity an upwardly extending cylindrical portion defining an inner wall of the coffee grounds confining chamber and the percolator tube receiving mounting aperture.

11. A disposable coffee container as defined in claim 1 wherein the perforated bottom of the generally cup-shaped body includes an outer flat and generally horizontal annulus and an inner upwardly extending frusto-cone portion carrying at its upper extremity an upwardly extending cylindrical portion defining an inner wall of the coffee grounds confining chamber and the percolator tube receiving mounting aperture, the cover disc also having a depending cylindrical portion defining its percolator tube receiving mounting aperture and disposed to telescope the beforementioned cylindrical portion.

12. A disposable coffee container as defined in claim 1 wherein the perforated bottom of the generally cup-shaped body includes an outer flat and generally horizontal annulus and an inner upwardly extending frusto-cone portion carrying at its upper extremity a cylindrical portion defining the percolator tube receiving mounting aperture, the cover disc also having a depending cylindrical portion defining its percolator tube receiving mounting aperture and disposed to telescope the beforementioned cylindrical portion and being flared downwardly and outwardly at its lower end extremity to interlock with and beneath the body bottom cylindrical portion.

13. A disposable coffee container as defined in claim 1 wherein the cup-like body is shaped up from a circular disc blank having slits preformed therein to provide the desired percolating perforations.

14. A disposable coffee container as defined in claim 1 wherein there also is provided a stiffener bead at the juncture of the side wall and the bottom of the cup-like body.

15. A disposable coffee container as defined in claim 1 wherein the perforated bottom of the generally cup-shaped body includes an outer flat and generally horizontal annulus and an inner upwardly extending frusto-cone portion carrying at its upper extremity an upwardly extending cylindrical portion defining an inner wall of the coffee grounds confining chamber and the percolator tube receiving mounting aperture wherein there also is provided a stiffener bead at the juncture of the side wall and the bottom of the cup-like body.

References Cited by the Examiner

UNITED STATES PATENTS

| | | | |
|---|---|---|---|
| 1,581,871 | 4/1926 | Roberts | 99—314 X |
| 2,020,104 | 11/1935 | Collin | 99—311 |
| 2,109,624 | 3/1938 | Ramstedt | 99—311 |
| 2,673,003 | 3/1954 | Stewart. | |
| 2,811,152 | 10/1957 | Wicks. | |
| 2,889,048 | 6/1959 | Hauser. | |
| 2,948,212 | 8/1960 | Sisselman et al. | 99—310 |
| 2,998,814 | 9/1961 | Forsberg. | |
| 3,083,100 | 3/1963 | Baran | 99—295 X |
| 3,095,801 | 7/1963 | Fogg | 99—312 |
| 3,119,694 | 1/1964 | Gauld | 99—295 X |

FOREIGN PATENTS 54,216   2/1922   Sweden.

WALTER A. SCHEEL, *Primary Examiner.*

WILLIAM I. PRICE, *Examiner.*

S. P. FISHER, *Assistant Examiner.*